United States Patent [19]

Abernethy

[11] Patent Number: 4,790,695
[45] Date of Patent: Dec. 13, 1988

[54] MODULAR DRILL JIG AND METHOD OF MAKING SAME

[76] Inventor: Robert R. Abernethy, 6541 Brookhill Dr., Garfield Hts., Ohio 44125

[21] Appl. No.: 381,196

[22] Filed: May 24, 1982

[51] Int. Cl.⁴ .............................................. B23B 47/28
[52] U.S. Cl. .................................. 408/115 R; 408/97; 408/103; 269/87.3; 269/902
[58] Field of Search ..................... 408/72 R, 72 B, 97, 408/115 R, 89, 115 B, 241 G, 103, 105, 107, 87; 269/87, 87.3, 91, 25, 902, 152

[56] References Cited

U.S. PATENT DOCUMENTS

| | | | |
|---|---|---|---|
| 550,767 | 12/1895 | Thielscher | 408/115 R |
| 901,249 | 10/1908 | Milne | 408/115 R |
| 1,529,557 | 3/1925 | Simon | 408/97 |
| 2,140,762 | 12/1938 | Pecker | 408/115 R |
| 2,315,318 | 3/1943 | Deubler, Jr. | 408/97 |
| 2,813,439 | 11/1957 | Gracon | 408/115 R |
| 2,976,748 | 3/1961 | Quick et al. | 408/97 |
| 3,313,188 | 4/1967 | Abernethy | 408/97 |
| 4,005,945 | 2/1977 | Gutman | 408/97 |

*Primary Examiner*—Gil Weidenfeld
*Assistant Examiner*—Daniel W. Howell
*Attorney, Agent, or Firm*—Renner, Otto, Boisselle & Sklar

[57] ABSTRACT

A modular drill jig and method of making same, characterized by parallel base, tool and bushing plates which have precision machined flat and adjacent right angle edge faces defining orthogonal reference planes and axes for aiding in fast, precision lay out of the locations of drill guide bushings and other tooling in the drill jig. The plates are removably assembled in modular fashion on common guide posts. The bushing and tool plates are movable relative to each other for clamping a part to be drilled between opposed parallel clamping faces of such plates. In the manufacture of the drill jig, the adjacent right angle edge faces on the plates enable fast and precision lay out of bores for the guide posts in the plates, such precision lay out ensuring proper vertical alignment of the plates and enabling the desired movement of the tool plate without binding thereof on the guide posts while maintaining the opposed clamping faces of the bushing and tool plates parallel.

15 Claims, 1 Drawing Sheet

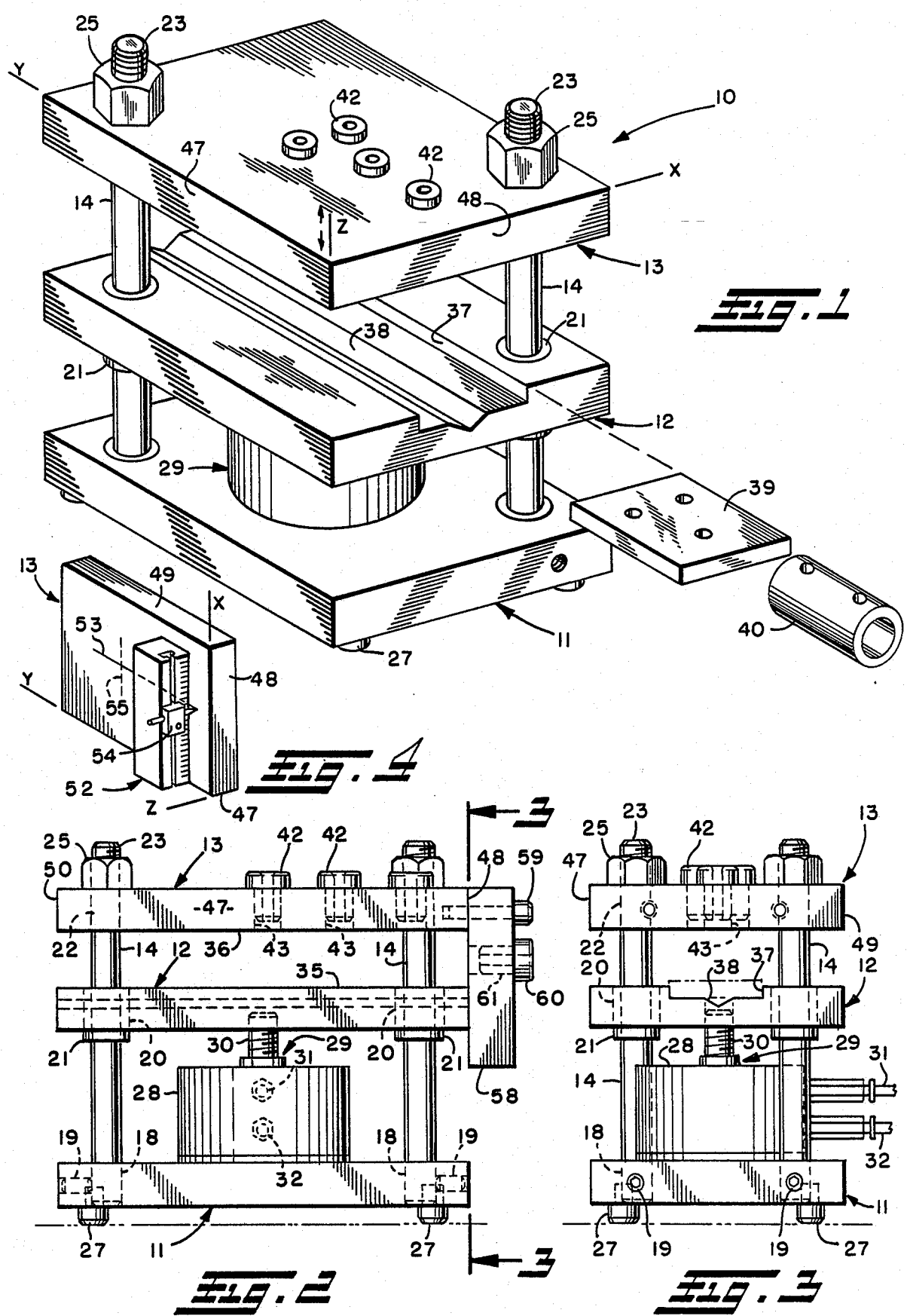

MODULAR DRILL JIG AND METHOD OF MAKING SAME

DISCLOSURE

This invention relates generally to part holding and tool locating jigs or fixtures used in the manufacture of duplicate parts and, more particularly, to an improved drill jig used as part holder and guide to bore similarly located holes in a number of like parts in repetitive drilling operations.

BACKGROUND OF THE INVENTION

A jig or fixture is used to speed up and simplify repetitive machining of like parts. The jib serves to hold and accurately locate the part being machined as well as to accurately guide the machine tool. In the case of a drill jig, the jig is used to hold and accurately locate the part being drilled upon and as a guide for the drill or drills whereby like holes may be drilled at similar locations in like parts in repetitive drilling operations.

Various kinds of jigs are known. One kind is characterized by a plurality of interchangeable and interconnectable jig building elements that may be assembled in a number of ways to obtain a desired jig configuration for the particular part to be machined. These building elements comprise base plates, sub-bases, angle plates, V-blocks, bushings and the like of various sizes and shapes which are machine finished so that they may be assembled in a variety of different combinations and configurations. A representative jig of this kind is shown in U.S. Pat. No. 2,676,413.

Another kind of jig, principally a drill jig, is characterized by a drill bushing top plate which is moved towards and away from a part supporting base or table by a quick acting clamp and lock mechanism. the drill bushing top plate may have located therein one or more drill guide bushings as the needs of the work require and most often are interchangeable so that the same base and clamping mechanism may be employed with different top plates for other jobs. Typically, the bottom surface of the bushing top plate and the opposed top surface of the base are precision machined flat, and the bushing top plate is guided by one or more upright guide posts so as to maintain the machined surfaces parallel for proper clamping of the part therebetween. The part may be directly supported on the top surface of the base but, most often, it is necessary to use a sub-base on the base to elevate the part to a position engageable by the bushing top plate within its usually limited range of clamping movement. Locating elements and stops may be attached to or provided in the bushing top plate or the sub-base for proper positioning of the part within the jig. It is conceivable that locating elements may be attached to or provided in the top surface of the base but this may preclude or limit its usage in different jobs. For a representative drill jig of this kind employing a rack and pinion clamping mechanism, reference may be had to U.S. Pat. No. 2,414,348.

Still another kind of drill jig employing a piston-cylinder clamp mechanism, is disclosed in applicant's own U.S. Pat. No. 3,313,188. This drill jig is characterized by an L-shaped bushing plate and base which permit drilling in one or two planes. The sides of the bushing plate form a right angular corner and respectively have planar bottom and side clamping faces which are precision machined square. In an alternative arrangement, the bushing plate further may have a third side which permits drilling in still another plane.

In drill jigs of the aforedescribed and other types, precision in locating the drill guide bushings is important to proper drilling of the holes in the part held and located in the jig. It is equally important to locate precisely the guide post holes to enable the desired movement of the bushing plate without binding while maintaining the desired tolerances between the bushing plate, guide posts and jig base. Generally, the guide post holes are pre-drilled by the jib manufacturer who supplies the assembled jig to the part manufacturer. The part manufacturer, as needed, drills the drill guide bushing holes in the bushing top plate as required for the particular part to be drilled upon in the jig.

Heretofore, it was necessary for the part manufacturer to use the guide post holes in the bushing top plate as a reference in laying out the locations of the drill guide bushings. This normally required finding the centers of the previously drilled guide post holes, which generally cannot be easily, quickly and precisely done. To simplify matters, templates have been used. The location of the drill guide bushings are first layed out on the template which then is placed on the bushing top plate and aligned with the guide post holes therein for transfer of the drill guide bushing locations to the bushing top plate. This procedure also has proved to be relatively difficult and time consuming.

SUMMARY OF THE INVENTION

The present invention provides an improved jig which greatly aids in fast, precision lay out or plotting of the locations of drill guide bushings, and other tooling as well, in the jig. Briefly, the drill jig comprises a bushing plate adapted to have one or more drill guide bushings located therein and means for clamping a part to be drilled to the bushing plate. In accordance with the invention, the bushing plate has at least two precision machined flat and adjacent right angle edge faces defining orthogonal reference planes and axes useful as a reference in locating precisely the orthogonal coordinates of the drill guide bushing or location stops on the bushing plate. With such an arrangement, no longer is it necessary to use templates or find the centers of previously drilled guide post holes in the bushing plate when laying out the drill guide bushing locations.

More particularly, the drill jig is comprised of a base plate, a movable tool plate and a bushing plate which are removably assembled in modular fashion on upright guide posts extending normal to the plates. Each plate is preferably of like dimension and has precisely machined flat and parallel top and bottom faces as well as precision machined right angle edge faces which define orthogonal reference planes and axes for aiding in fast lay out or plotting of the drill guide bushing and tool locations in the jig.

The right angle edge faces also aid in the manufacture of the drill jig by providing right angle reference planes or axes that may be used to locate precisely the orthogonal coordinates of guide post bores in the plates. Precision in locating the guide post bores in this manner ensures proper vertical alignment of the plates and enables the desired movement of the tool plate without binding while maintaining opposed clamping faces of the bushing and tool plate parallel. Such precision locating may be readily accomplished by placing the edge face of the plate on a flat surface and sliding a flat based scribe, having its awl, pen or the like set to the desired coordinate, along such flat surface to mark a line on the plate parallel to such edge face at the desired coordinate. Similarly, a second line corresponding to the other coordinate of the bore may be marked by placing the plate on an adjacent edge face and re-setting the scribe to such other coordinate. The intersection of the two lines precisely marks the center of the guide post bore for subsequent drilling thereof. A similar technique may be employed to lay out or plot the locations of the drill guide bushings and any other tooling the plates.

BRIEF DESCRIPTION OF THE DRAWING

In the annexed drawing:

FIG. 1 is an isometric view of a preferred form of drill jig according to the invention;

FIG. 2 is a side elevation of the drill jig of FIG. 1 which has provision for multi-planar drilling;

FIG. 3 is an end elevation of the drill jig of FIG. 2, as seen from the line 3—3 of FIG. 2; and FIG. 4 is a reduced isometric view illustrating one way the center of a hole may be plotted on a plate of the drill jig.

DETAILED DESCRIPTION

Referring now in detail to the drawing, and initially to FIG. 1, a drill jig according to the invention is designated generally by reference numeral 10. The drill jig 10 consists principally of a base plate 11, tool plate 12 and bushing plate 13. The plates are generally planar and rectangular as shown and are maintained in assembled parallel relationship by guide posts 14 that extend perpendicularly to the plates. Although two such posts are shown and located at diagonally opposed corners of the rectangular plates, the posts may be of a different number and/or otherwise arranged such as at the four corners of the plates.

As best seen in FIGS. 2 and 3, the lower end of each guide post 14 may be fixed in a bore 18 in the base plate 11 such as by set screws 19 or other means which permit ready assembly and disassembly of the guide posts from the base plate. The tool plate 12 also has a bore 20 therein for each post and each bore 20 may have fitted therein a post guide bushing 21 which slides on the guide post and maintains the tool plate parallel with the base plate and, more importantly, the bushing plate 13. The bushing plate 13 likewise has a bore 22 therein for each guide post or more accurately the reduced diameter neck 23 at the upper end of each guide post. The reduced diameter neck 23 forms a shoulder with the larger diameter post and this shoulder supports the bushing plate is spaced parallel relation to the base plate 11. A nut 25 tightened on the threaded end of the guide post 14 secures the bushing plate to the guide post. The post bores are precisely formed and the guide bushing 21 is selected to minimize lateral play and wear of the bushing in relation to the guide posts so as to maintain the tool and bushing plates in alignment. As can be readily appreciated, the corresponding holes in the plates through which pass the guide posts are in coaxial alignment.

The base plate 11 may if desired to be provided with feet 27 at the four corners thereof to support the drill jig 10 with a minimum hardened surface area on a task surface. Alternatively or additionally, the base plate may be provided with other means which permit clamping of the base plate, for example, to the working table of a dress press, with equal stress points.

The base plate 11 may also have mounted thereon the cylinder 28 of an internally threaded piston-cylinder assembly 29. The threaded adjustable extension length 30 extends vertically and may be attached to the tool plate 12 as indicated. Suitable supply lines 31 and 32 may be provided for connecting the cylinder to a source of pressurized air through a suitable valve for effecting extension and retraction of the cylinder assembly and extension length 30 and hence movement of the tool plate 12 toward and away from the bushing plate 13. Such source of pressurized air may be example be a foot treadle pump which frees both hands of the jig operator during clamping of a part or workpiece in the jig. To prevent the development of excessive moment forces acting on the tool plate, which may cause the tool plate to bind-up on the guide posts, the piston-cylinder and threaded adjustable extension length preferably is centrally disposed in relation to the plates and the guide posts. Although a pneumatic piston-cylinder assembly is shown and preferred, other mechanical means for moving the tool plate towards and away from the bushing plate may be employed.

As will be apparent, when the piston-cylinder assembly 29 and threaded rod 30 are extended, the tool plate 12 and bushing plate 13 may be used to hold or clamp therebetween a part in which one or more holes are to be drilled. To ensure accurate engagement with the part, the respective opposed clamping faces 35 and 36 of the tool plate 12 and bushing plate 13 are precision machined parallel with each other. That is, the top face 35 of the tool plate and the bottom face 36 of the bushing plate are precision machined flat and parallel, and such parallelism is established and maintained by the guide posts 14 as aforedescribed.

In known manner, tooling consisting of one or more locating and stop elements may be provided at either one or both of the clamping faces 35 and 36. Such locating and stop elements may consist of a work-supporting sub-base secured to the tool plate at the top clamping face 35 thereof or, as illustrated, locating elements may be, for example, in the form of locating grooves 37 and 38 or indexing holes, not shown, in the tool plate. The locating groove 37 illustrated is rectangular in cross-section for use with a correspondingly shaped part 39 whereas the locating groove 38 is shown as being V-shaped for use with a cylindrical part 40.

It is important that any locating and stop elements be properly secured to or included in the tool plate 12 or bushing plate 13 so as to position precisely in the drill jig the part to be drilled. More particularly, the part must be precisely positioned and aligned with the bushing plate which may have one or more drill guide bushings 42 fitted therein in respective drill guide bushing holes 43. The drill guide bushings provide for accurate guiding of a drill into the part when the part is clamped and precisely positioned between the bushing and tool plates.

As discussed above, heretofore it was common practice to lay out the location of the drill guide bushing holes 43 on the bushing plate 13 by reference to guide post holes 22 in the bushing plate, such task being facilitated by use of a template. This procedure however is time-consuming and to some extent lacks precision particularly because of the difficulty in precisely locating the center of the guide post holes. As will become apparent from the following discussion, the drill jig according to this invention enables fast and precision lay out of the drill guide bushing hole locations and with aligned modular units permits lower tooling costs.

In accordance with this invention, the bushing plate 13 has precisely machined flat edge faces 47-50 which form right angular corners. As a result, the edge faces define orthogonal reference planes. The edge faces also are formed at right angles to the clamping face 36 whereby orthogonal reference axes are defined at the intersecting edges of the faces, one set of such axes being designated arbitrarily by the letters X, Y and Z in FIG. 1.

With a bushing plate 13 as thusly formed, the orthogonal coordinates of the drill guide bushings 42 can be precisely located on the bushing plate with reference to any two adjacent edge faces. For instance, the center of a drill guide bushing hole 22 can be located by plotting the X coordinate, i.e., the distance from the edge face 47, and the Y coordinate, i.e., the distance from the edge face 48.

As illustrated in FIG. 4, plotting the coordinate of a drill guide bushing hole 22 or guide post holes or other holes on the bushing plate 13 can be easily accomplished by laying an edge face of the bushing plate, such as edge face 47, on a face support surface and using a scribe 52 to draw, scratch or otherwise mark a center line 53 parallel to the edge face 47 resting on the flat surface at the desired coordinate or, more accurately, the desired distance from such edge face 47 corresponding to such coordinate. Such a scribe 52 may have a flat base which is adapted to slide along the flat support surface and an adjustable awl, pen or the like 54 which may be set at the desired coordinate. Other types of scribes or the like may be employed as well. After marking the center line 53, the bushing plate may be turned 90° so that another edge face, such as edge face 48, adjacent that previously placed on the flat support surface rests on such surface. The scribe, having been adjusted to the desired other coordinate, may then be used to mark on the bushing plate the other center line 55 in the same manner that the first center line 53 was marked. The intersection of the thusly marked center lines 53, 55 precisely locates the center of the hole to be drilled in the bushing plate.

The busing plate 13 may be made of a soft metal such as anodized aluminum which is easily scratched by an awl and provides for good scribe line definition.

Although center lines and the like may be marked on the bushing plate 13 such as in the above indicated manner, it should be appreciated that they need not be made such as when the plate is to be machined in a machine tool having conventional reference guides against which the edge faces 47-50 of the plate may be butted. By setting the machine tool reference guides to the proper coordinates, the plate may be precisely machined in the desired manner.

The tool plate 12 and base plate 11 may be similarly formed with precisely machined flat vertical edge faces which form right angular corners. Accordingly, any locating elements, such as the locating grooves 37 and 38 or indexing holes may be precisely located in the tool plate with reference to the edge faces thereof. Also, the piston-cylinder assembly 29 and 30 can be precisely centered on the base plate with reference to its edge faces to permit equal clamping forces.

The base plate 11 and tool plate 12 are of the same planar dimension as the bushing plate 13 and when assembled on the guide posts 14, the edge faces of the plates will be aligned and co-planar. Accordingly, the guide post bores provided in the plates through which the guide posts pass are located at the same coordinates in relation to the edge faces of each respective plate.

Although all of the edge faces and planar faces of the plates 11-13 may be precision machined flat as indicated and illustrated, it may only be necessary that two adjacent, right angle edge faces of each plate be thusly machined as only two such faces are needed to define orthogonal reference planes from which the drill guide bushing locations, etc., may be plotted. In addition, only the bushing plate 13 may need to be thusly formed if it contains both the drill guide bushings 42 and locating elements 37, 38 or indexing holes. If the tool pate 12 contains the locating elements, then it should also be thusly formed. The base plate preferably is formed in like manner so that all machined edge faces are co-planar. This permits the jig to be set on its side on such aligned and co-planar edge faces whereby the location of the drill guide bushing holes may be laid out on the top plate and drilled therein without disassembly of the drill jig.

In addition, the aligned edge faces of the plates 11-13 permit multi-plane drilling, e.g., drilling of cross holes normal to those drilled by usage of the drill bushings 42. As seen in FIG. 2, a side plate 58 may be fixed such as by screws 59 to the bushing plate 13 in butted engagement with an edge face thereof, such as edge face 48. The side plate 58 extends below the bushing plate and preferably is in sliding butted engagement with an edge face of the tool pate 12. For drilling the cross holes in the part held between the bushing and tool plate, one or more drill guide bushings 60 may be fitted in respective drill guide bushing holes 61 in the side plate. The locations of such drill guide bushing holes 61 may be precisely located with reference to the precision machined flat and square edge faces of the side plate which in turn are precision reference to the edge faces and clamping face of the bushing plate, whereby the drill guide bushings 60 will be properly located in relation to the part clamped between the tool and bushing plates.

The foregoing description generally describes a modular drill jig as same would be supplied to a part manufacturer as well as the laying out of the drill guide bushing holes and locating reference locations on the bushing and tool plates 12 and 13 which usually would be performed by the part manufacturer when setting up the jig for the part to be drilled upon therein. The part manufacturer could also be supplied with the assembled drill jig including blank bushing and tool plates. The plates may be readily disassembled from the guide posts 14 and bored and otherwise machined as needed and reassembled for use. It also is contemplated that the plates and guide posts may be interchanged with other plates and posts to meet the needs of differnent jobs. For example, worn posts or various tooling plates with complex workpiece nesting may be employed. More importantly, the bushing plate 13, and the tool plate 12 if necessary, may be readily interchanged with other plates for differnent jobs. Because of their flat and uniform profile, the bushing plates and tooling plates may be conveniently catalogued and stacked for storage purposes when not needed for the job with which the jig is being used.

With regard to the method of making a drill jig according to this invention, the guide post holes of the plates 11-13 may be precisely located therein by the jig manufacturer in the same manner as the drill guide bushing holes 43 are located in the bushing plate 13.

Accordingly, the relative positions of the edge faces of the plates are known with respect to the common guide posts 14. As a result, the various drill guide bushings and locating elements may be precisely aligned in the drill jig with reference to the known relative positions of the edge faces which, as indicated above, preferably are aligned. Thus, the part to be drilled is assured of being held in proper relation to the drill guide bushings 42 provided in the bushing plate 13.

Although the invention has been shown and described with respect to a preferred embodiment, it is obvious that equivalent alterations and modifications such as to reciprocate the bushing plate and keep the tool bushing plate stationary will occur to others skilled in the art upon the reading and understanding of the specification. Obviously for more precision greater accuracy will be required for obtaining parallel plane surfaces, hole locations and equally stressed contact areas. The present invention includes all such equivalent alterations and modifications, and is limited only by the scope of the following claims.

What is claimed is:

1. A drill jig comprising a bushing plate adapted to have one or more drill guide bushings located therein, and means for clamping a part to be drilled to said bushing plate, said bushing plate having at least two precision machined flat and adjacent right angle edge faces defining orthographic reference planes for use as a reference in locating precisely the orthogonal coordinates of the drill guide bushings in said bushing plate, said means for clamping including a tool plate, said tool plate also having at least two precision machined flat and adjacent right angle edge faces, said bushing and tool plates having opposed clamping faces which are precision machined flat at right angles to the respective precision machined edge faces thereof, said clamping face on said tool plate having locating means for positioning in relation to said bushing plate a part to be drilled, said precision machined edge faces on said tool plate defining orthographic reference planes for use as a reference in locating precisely the orthogonal coordinates of said locating means on said tool plate, an at least two guide posts fixed in respective guide post bores in one of said plates at right angles to the clamping face thereof and slidably received in respective guide post bores in the other of said plates and cooperative therewith to maintain parallel and vertically aligned the clamping faces of said plates, the corresponding precision machined edge faces of said bushing and tool plates also being co-planar.

2. The drill jig of claim 1 further comprising a side plate affixable to one of said plates in butted engagement with a precision machined edge face thereof and in sliding butted engagement with a corresponding precision machined edge face of the other of said plates, said side plate having one or more drill guide bushings located therein.

3. The drill jig of claim 2 wherein all adjacent edge faces of said plates are precisely machined square and at right angles to the respective clamping faces of said plates.

4. The drill jig of claim 3 wherein all corresponding edge faces of said plates are co-planar.

5. The drill jig of claim 1 wherein said bushing plate is fixed to said posts and said tool plate slides on said posts.

6. The drill jig of claim 5 further comprising a base plate fixed to said posts at the side of said tool plate opposite said bushing plate.

7. The drill jig of claim 6 wherein said base plate has two precision machined flat and adjacent right angle edge faces defining orthographic reference planes for use as a reference in locating precisely the orthogonal coordinates of bores in said base plate in which said posts are fitted, said base plate being parallel to said bushing and tool plates.

8. The drill jig of claim 7 wherein said means for clamping further includes a piston-cylinder assembly interposed between said base and tool plates.

9. The drill jig of claim 1 wherein said bushing plate is removably fixed to said posts.

10. The drill jig of claim 1 wherein said bushing plate has a plurality of drill guide bushings precisely located therein from said orthographic reference planes defined by said precision machined flat and adjacent right angle edge faces on said bushing plate.

11. The drill jig of claim 10 wherein the corresponding precision machined edge faces of said bushing and tool plates are co-planar.

12. The drill jig of claim 11 further comprising a side plate affixable to one of said plates in butted engagement with a precision machined edge face thereof and in sliding butted engagement with a corresponding precision machined edge face of the other of said plates, said side plate having one or more drill guide bushings located therein.

13. The drill jig of claim 11 wherein all adjacent edge faces of said plates are precisely machined square and at right angles to the respective clamping faces of said plates.

14. The drill jig of claim 11 further comprising a base plate fixed to said posts at the side of said tool plate opposite said bushing plate, said base plate being parallel to said bushing and tool plates and having at least two precision machined flat and adjacent right angle edge faces defining orthographic reference planes for precisely locating bores in said base plate for said posts, the corresponding precision machined edge faces on said bushing plate, tool plate, and base plate being co-planar.

15. The drill jig of claim 14 wherein said means for clamping further includes a piston-cylinder assembly interposed between said base and tool plates

* * * * *